United States Patent
Lee (10) Patent No.: US 7,855,528 B2
(45) Date of Patent: Dec. 21, 2010

(54) POWER SUPPLY FOR PORTABLE APPARATUSES

(75) Inventor: Yu-Lung Lee, Taipei Hsien (TW)

(73) Assignee: Powertech Industrial Co., Ltd., Taipei Hsien (TW)

( * ) Notice: Subject to any disclaimer, the term of this patent is extended or adjusted under 35 U.S.C. 154(b) by 355 days.

(21) Appl. No.: 11/829,378

(22) Filed: Jul. 27, 2007

(65) Prior Publication Data

US 2008/0258677 A1 Oct. 23, 2008

(30) Foreign Application Priority Data

Apr. 18, 2007 (TW) .............................. 96113656 A (51) Int. Cl.
*H02J 7/00* (2006.01)
(52) U.S. Cl. .................. 320/107; 320/110; 320/113
(58) Field of Classification Search ................. 320/114, 320/107
See application file for complete search history.

(56) References Cited

U.S. PATENT DOCUMENTS

| | | | | |
|---|---|---|---|---|
| 5,369,565 A | * | 11/1994 | Chen et al. ................ | 363/146 |
| 5,734,253 A | * | 3/1998 | Brake et al. ................ | 320/125 |
| 6,774,603 B2 | * | 8/2004 | Liao ........................... | 320/107 |
| 7,573,229 B2 | * | 8/2009 | Arakelian ................... | 320/107 |
| 2001/0002788 A1 | * | 6/2001 | Koike ......................... | 320/108 |
| 2005/0231161 A1 | * | 10/2005 | Jones et al. ................ | 320/114 |
| 2006/0119104 A1 | * | 6/2006 | Wall ............................. | 290/2 |

* cited by examiner

*Primary Examiner*—Edward Tso
*Assistant Examiner*—Johali A Torres Ruiz
(74) *Attorney, Agent, or Firm*—Rosenberg, Klein & Lee (57) ABSTRACT

A power supply for portable apparatuses includes a plurality of power supplies and at least one charging station. Each power supply has a housing, a power input portion, a plurality of power output portions, a storage battery, and a first circuit board. The first circuit board is electrically connected with the storage battery and both are located in the housing. The power input portion and the power output portions are electrically connected with the first circuit board. The charging station includes a base, a plurality of charging connectors, and a second circuit board. The base has a plurality of charging ports that can be connected with the power supplies. The second circuit board is located in the base. The charging connectors are electrically connected with the second circuit board. The charging connectors respectively correspond to the charging ports for charging the power supply connected with the charging ports.

16 Claims, 14 Drawing Sheets

POWER SUPPLY FOR PORTABLE APPARATUSES

BACKGROUND OF THE INVENTION

1. Field of the Invention

The present invention relates to a power supply for portable apparatuses. In particular, this invention relates to a power supply that provides power for a plurality of portable apparatuses (such as laptops, cell phones, and MP3 players, etc.) in a commercial environment.

2. Description of the Related Art

Laptops, cell phones, and MP3 players need a built-in battery to provide their required power. When the power stored in the built-in battery is exhausted, the portable apparatus cannot work. It is inconvenient for the user.

The power supply of the prior art can only be used by a single user. When the user is in a public place or outdoors, the sockets for a great number of users are usually inadequate. Especially, in commercial locations, such as a coffee shop, or a store, there is no power supply that can provide enough power for a plurality of portable apparatuses.

A portable apparatus of the prior art is supplied power via a charging wire. The charging wires are usually unorganized and interfere with each other.

SUMMARY OF THE INVENTION

One particular aspect of the present invention is to provide a power supply for portable apparatuses. The power supply is applied to a commercial location. Power can therefore be easily obtained by users. The problem there being an inadequate amount of sockets for users and/or users having to carry a charging wire are solved. The clutter and interference caused by the charging wires are also overcome.

One particular aspect of the present invention is to provide a power supply for portable apparatuses. When power in the power supply is exhausted, a notice that the power is exhausted is issued to the charging station via a built-in wireless transmission module. The store owner is notified to take back the power supply and charge the power supply at the charging station.

The power supply for portable apparatuses includes a plurality of power supplies, and at least one charging station. Each power supply has a housing, a power input portion, a plurality of power output portions, a storage battery, and a first circuit board. The storage battery and the first circuit board are located in the housing. The first circuit board is electrically connected with the storage battery. The power input portion and the power output portions are electrically connected with the first circuit board. The charging station includes a base, a plurality of charging connectors, and a second circuit board. The base has a plurality of charging ports that can be connected with the power supplies. The second circuit board is located in an interior of the base. The charging connectors are electrically connected with the second circuit board. The charging connectors respectively correspond to the charging ports for charging the power supply connected with the charging ports.

The present invention has the following characteristics. The present invention provides a handy, simple and rapid power supplying system for a great number of users. The inconvenience caused by a lack of power supplies available for users is avoided. The power supply system can be applied indoors, outdoors or in any other public place, but especially in a commercial location. The problems of the number of sockets for a number of users being inadequate and the user having to carry a charging wire are solved. The disarray and interference caused by the charging wires are also overcome.

Moreover, when power in the power supply is exhausted, a notice that power is exhausted is issued to the charging station by utilizing the notice transmission function of the built-in wireless transmission module. An indicating lamp is used to issue an alarm light or a sounding device to issue an alarm sound to the store owner so that the store owner becomes aware that he or she needs to take back the power supply and charge the power supply at the charging station.

For further understanding of the invention, reference is made to the following detailed description illustrating the embodiments and examples of the invention. The description is only for illustrating the invention and is not intended to be considered limiting of the scope of the claim.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

Figure 1:
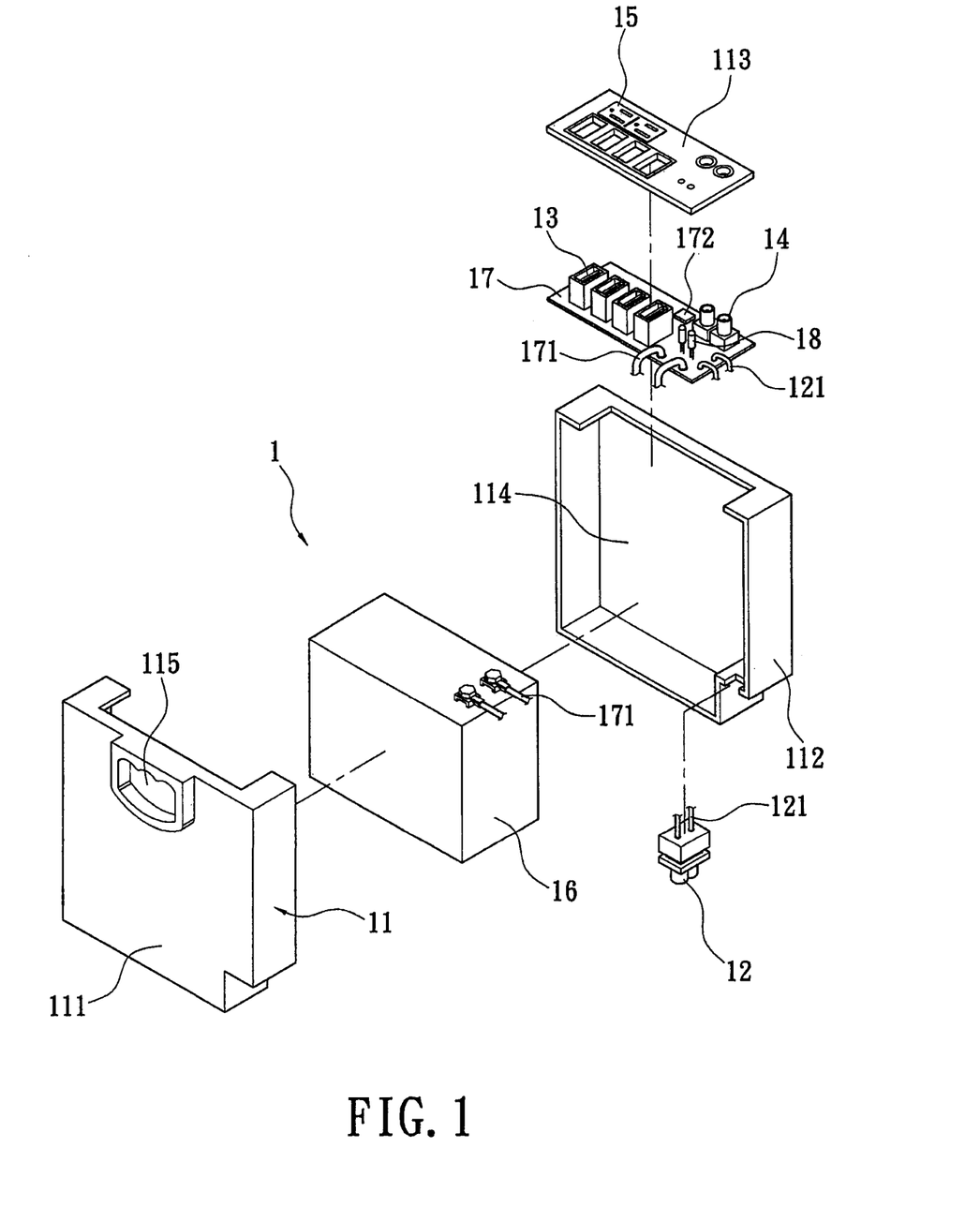
FIG. 1 is an exploded perspective view of the power supply of the present invention.
Figure 2:
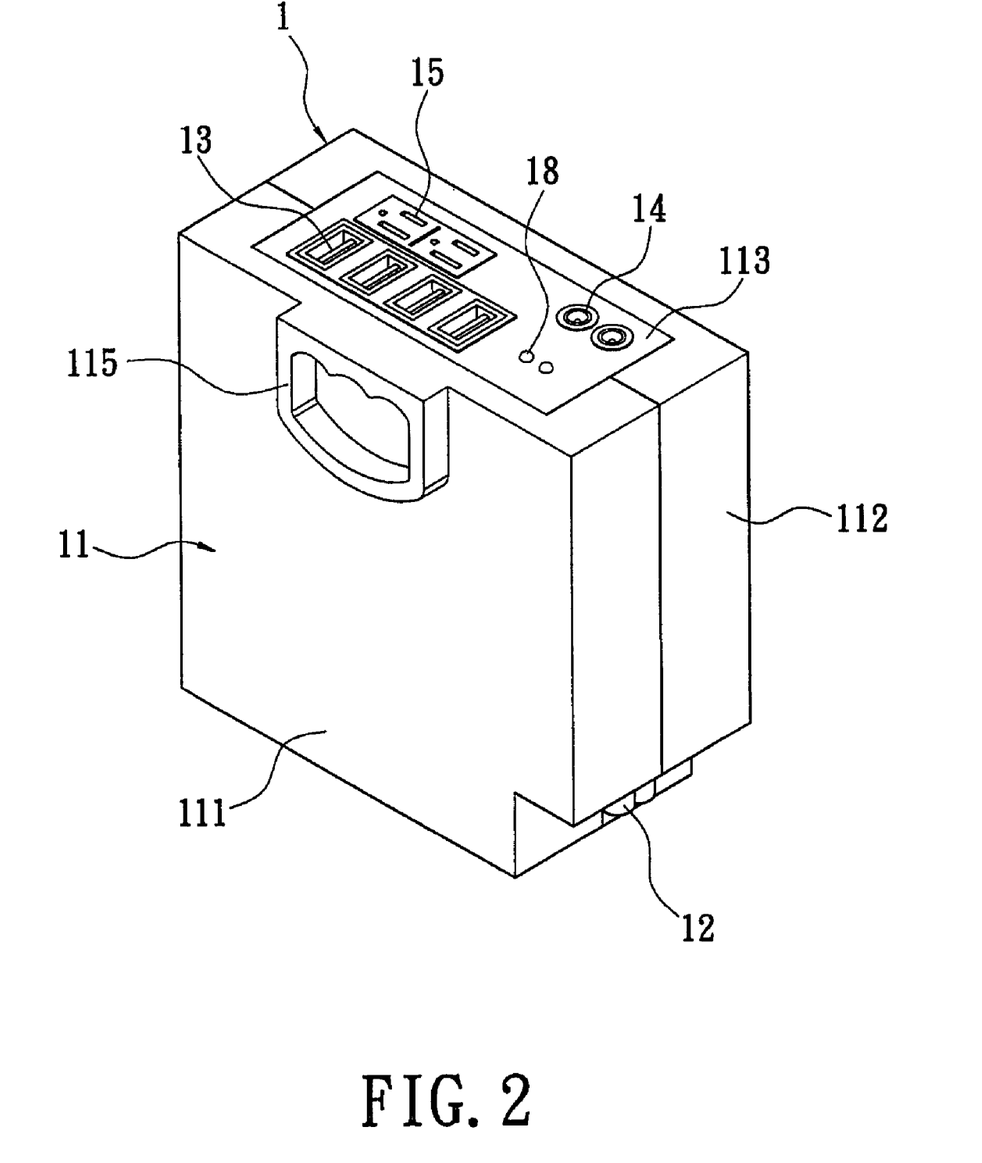
FIG. 2 is a perspective view of the power supply of the present invention.
Figure 3:
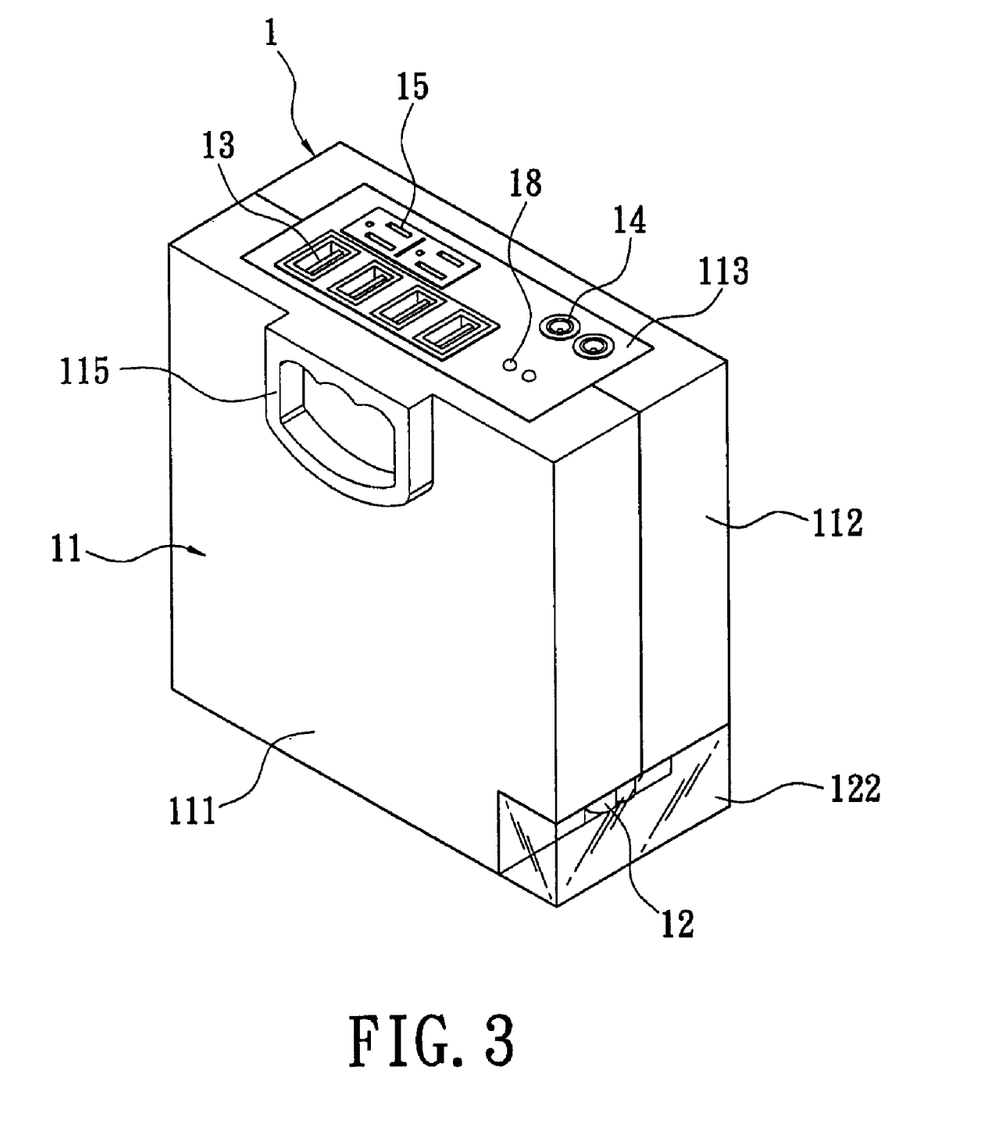
FIG. 3 is another perspective view of the power supply of the present invention.
Figure 4:
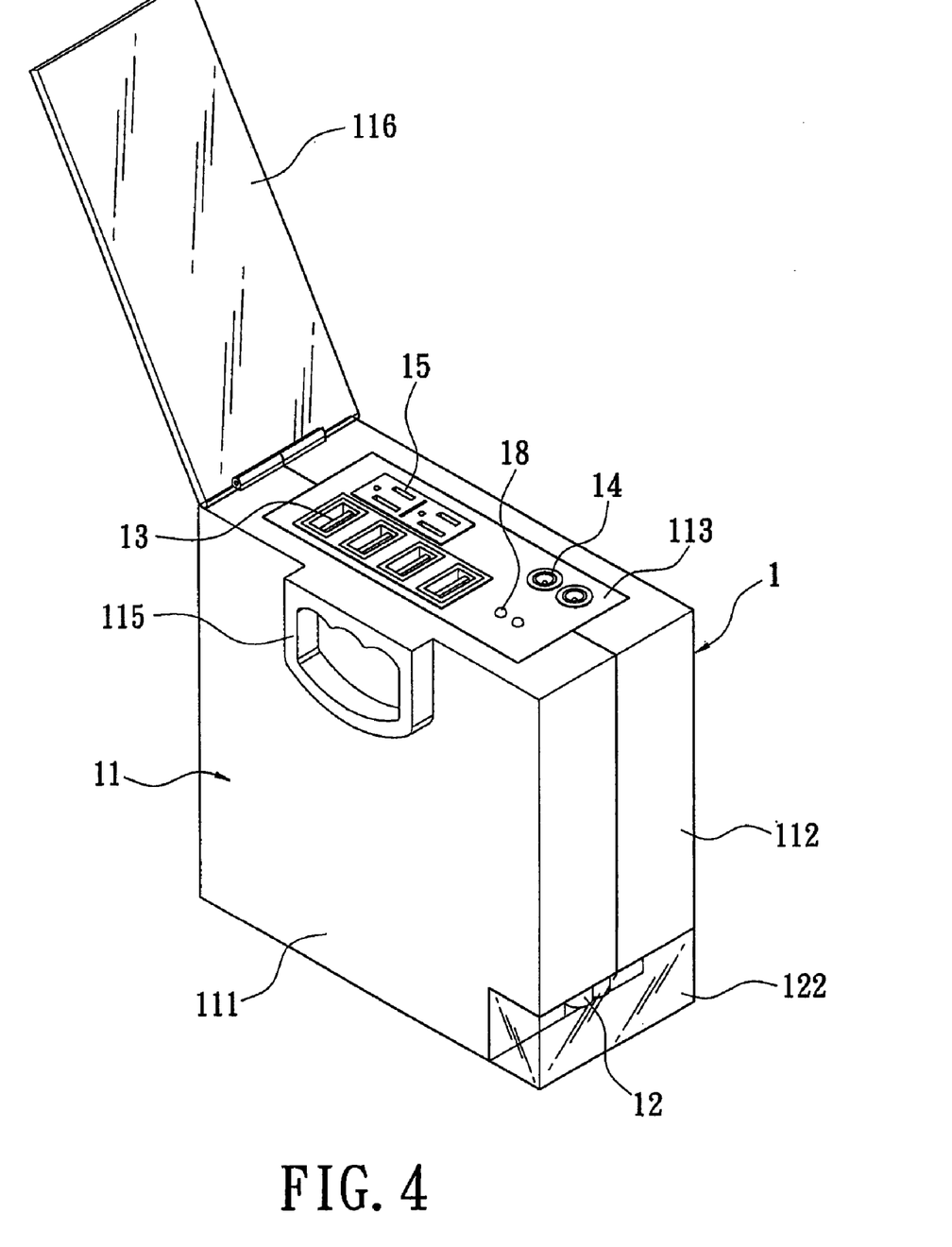
FIG. 4 is a further perspective view of the power supply of the present invention.

Reference is made to FIGS. 1~7, which show a power supply for portable devices. The power supply for portable devices includes a plurality of power supplies 1 and at least one charging status 2. The power supply 1 can be operated indoors or outdoors. FIGS. 2 and 3 show the power supply 1 operating indoors. FIG. 4 shows the power supply 1 operating outdoors As shown in FIGS. 2 and 3, in this embodiment, the power supply 1 includes a housing 11, a power input portion 12, four first power output portions 13, two second power output portions 14, two third power output portions 15, a storage battery 16, and a first circuit board 17. The housing 11 includes a first half shell 111, a second half shell 112, and a cover 113. The first half shell 111 and the second half shell 112 are assembled together using a wedging method, a screwing method, or an ultrasonic method. The cover 113 is installed at the opening located at the top of the first half shell 111 and the second half shell 112. There is a receiving space 114 in the interior of the housing 11, and there is a handle 115 located on the outside of the housing 11. It is convenient for the user to carry the power supply 1.

Figure 14:
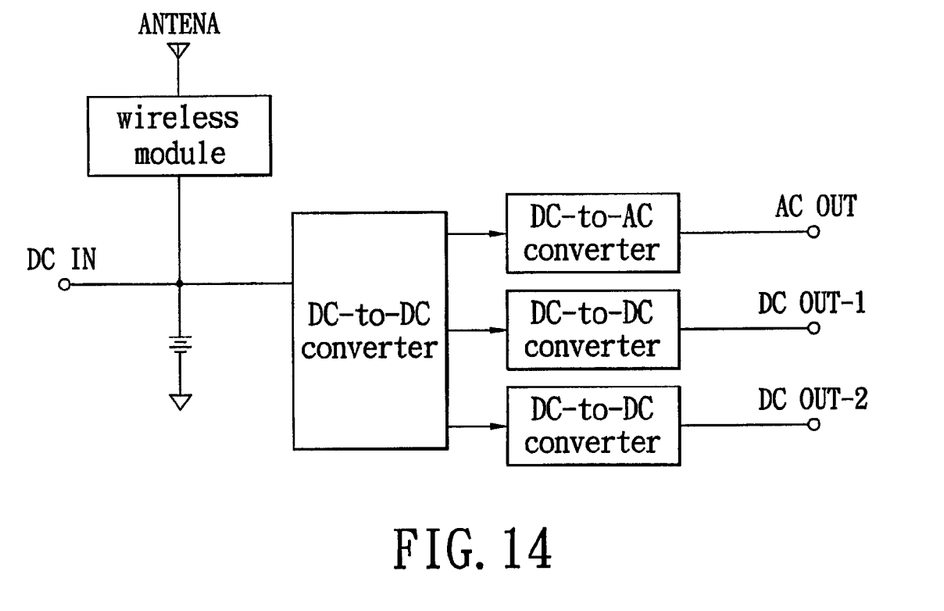
FIG. 14 is a block diagram of the circuit of the power supply of the present invention.

The storage battery 16 and the first circuit board 17 are located in the receiving space 114 of the housing 11. The storage battery 16 is a rechargeable storage battery, and is not limited to a specified type. The first circuit board 17 is electrically connected with the storage battery 16 via a conductive wire 171. A first wireless module 172 is built-in the first circuit board 17. The first wireless module 172 utilizes an RF or a Z-wave to provide wireless transmission. FIG. 14 shows a block diagram of the circuit of the power supply 1. The circuit is composed of a plurality of DC-to-DC converters, a first wireless module, and a DC-to-AC converter, etc. The first circuit board 17 is electrically connected with a plurality of first indicating lamps 18. In this embodiment, the first indicating lamp 18 is an LED lamp. The first indicating lamps 18 is exposed outside of the cover 113 of the housing 11 to display the operating status and the power status of the power supply 1.

The power input portion 12 is a charging and plugging head. The power input portion 12 is electrically connected with the first circuit board 17 via a conductive wire 121 for inputting power into the first circuit board 17 and the storage battery 16. The power input portion 12 is fastened onto the housing 11 by a wedging method. The power input portion 12 is exposed to the outside of the housing 11 so as to electrically connect with the charging connector 22 of the charging station 2.

The first power output portions 13, the second power output portions 14, and the third power output portions 15 are electrically connected with the first circuit board 17. The first power output portions 13, the second power output portions 14 and the third power output portions 15 are exposed outside of the cover 113 of the housing 11 via the opening holes on the cover 113 so as to electrically connect with the connectors of the portable devices.

In this embodiment, the first power output portions 13 are USB connectors, the second power output portions 14 are DC sockets, and the third power output portions 15 are AC sockets. Because the structures of the USB connectors, the DC sockets, and the AC sockets are the same as the prior art, the detailed descriptions do not need to be repeated again. The quantity, the type, and the disposing method of the first power output portions 13, the second power output portions 14 and the third power output portions 15 are not limited to specific ones.

As shown in FIGS. 3 and 4, in this embodiment, the power input portion 12 is covered by a protecting cover 122. The protecting cover 122 is used for protecting the power input portion 12 and prevents the power input portion 12 from being damaged. As shown in FIG. 4, a waterproof cover 116 is pivoted on the housing 11. The waterproof cover 116 can be opened or closed. The waterproof cover 116 covers the first power output portions 13, the second power output portions 14, and the third power output portions 15. When the power supply 1 is operating outdoors, the protecting cover 122 waterproofs the power supply 1.

Figure 5:
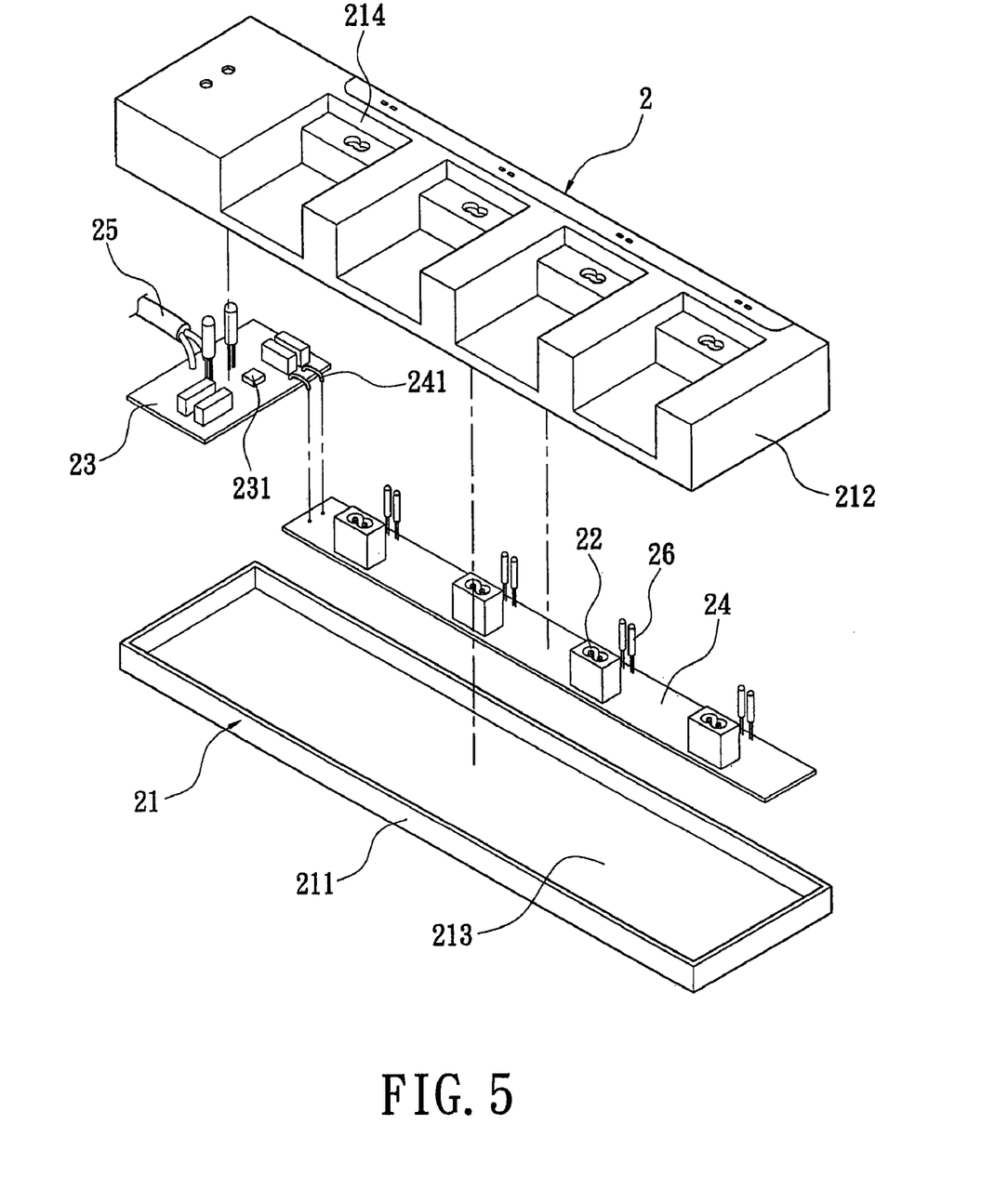
FIG. 5 is an exploded perspective view of the charging station of the present invention.
Figure 6:
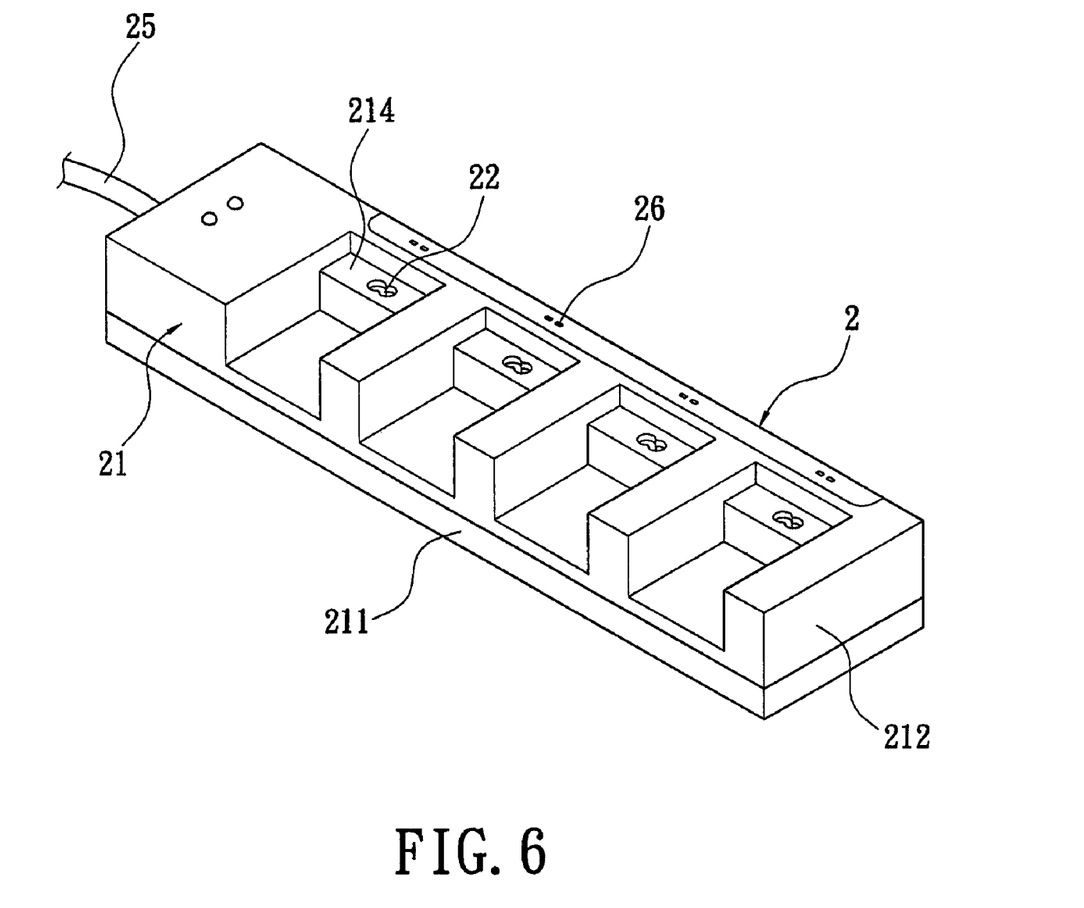
FIG. 6 is a perspective view of the charging station of the present invention.

As shown in FIGS. 5 and 6, in this embodiment, the charging station 2 includes a base 21, a plurality of charging connectors 22, a second circuit board 23, and a third circuit board 24. The base 21 includes a lower shell 211 and an upper shell 212. The lower shell 211 and the upper shell 212 are assembled together by a wedging method, a screwing method, or an ultrasonic method to form a hollow shell. In the interior of the base 21, there is a second receiving space 213. There is a plurality of charging ports 214 located at the top of the base 21 and disposed at intervals. The charging ports 214 are located on the base by an indenting method to form a charging station 2 with multiple holes and can be plugged with a plurality of power supplies 1 that will be charged.

The charging connectors 22 are sockets and correspond to the power input portion 12 of the power supply 1. The type of the charging connector 22 and the power input portion 12 of the power supply 1 are not limited to a specific kind. The charging connectors 22 are fastened on and electrically connected with the third circuit board 24. The second circuit board 23 and the third circuit board 24 are received in the second receiving space 213 of the base 21. The second circuit board 23 is electrically connected with a power wire 25 for inputting power into the second circuit board 23 and the third circuit board 24 and provides a charging power for the charging connectors 22.

The second circuit board 23 and the third circuit board 24 are electrically connected with a plurality of second indicating lamps 26. The third circuit board 24 is electrically connected with the second circuit board 23 via a conductive wire 241 so that the charging connectors 22, the second indicating lamps 26, and the second circuit board 23 are electrically connected together. In this embodiment, the second indicating lamp 26 is an LED lamp. The second indicating lamps 26 are exposed to the outside of the base 21 to display the charging status of the storage battery 16 of the power supply 1. Furthermore, the second indicating lamps 26 can also notify the store owner that the power of the power supply 1 is exhausted. The second circuit board 23 can also be electrically connected with an alarming device (not shown in the figure) to issue an alarming sound to inform the store owner that power of the power supply 1 is exhausted.

Figure 15:
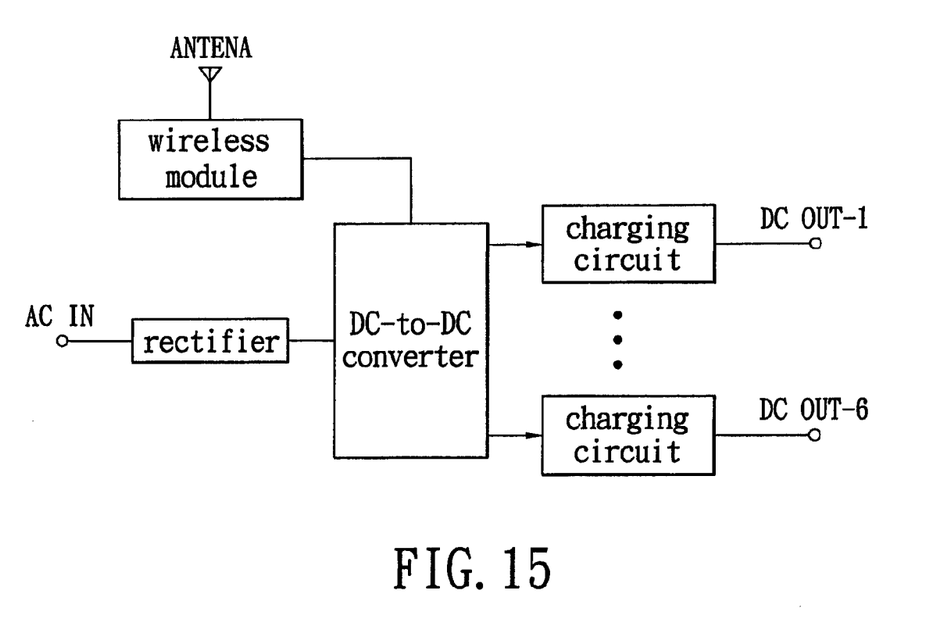
FIG. 15 is a block diagram of the circuit of the charging station of the present invention.

The charging connectors 22 correspond to the bottom of the charging ports 214. When the power supply 1 is plugged into the charging port 214, the power input portion 12 of the power supply 1 is plugged with and electrically connected with the charging connectors 22 located on the bottom of the charging port 214. The second circuit board 23 is built-in with a second wireless module 231. The second wireless module 231 utilizes the RF or Z-wave to provide wireless transmission. The second wireless module 231 is used for receiving the signal from the first wireless module 172. As shown in FIG. 15, this shows a block diagram of the circuit of the charging station 2. The circuit includes a rectifier, a DC-to-DC converter, a second wireless module, and a plurality of charging circuits.

Figure 9:
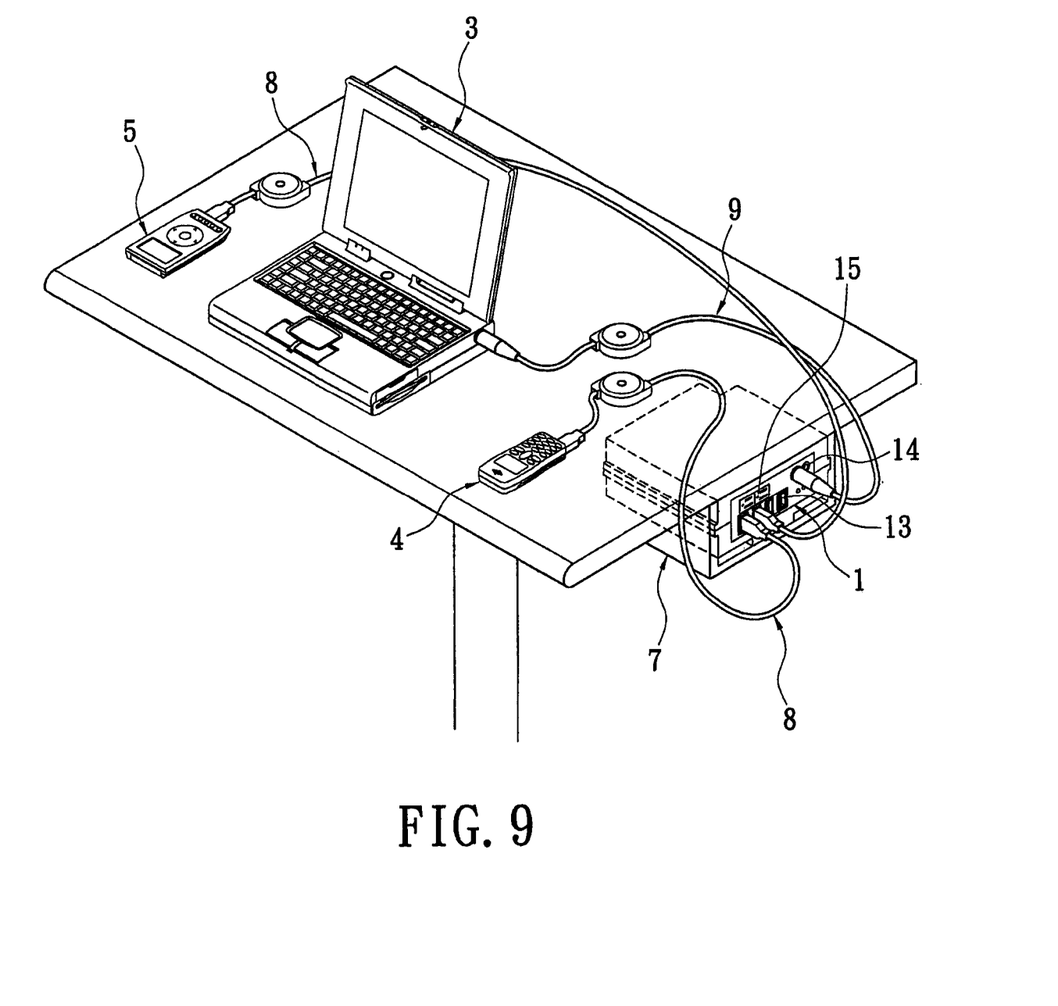
FIG. 9 is a perspective view of the operating status of the power supply of the present invention.
Figure 10:
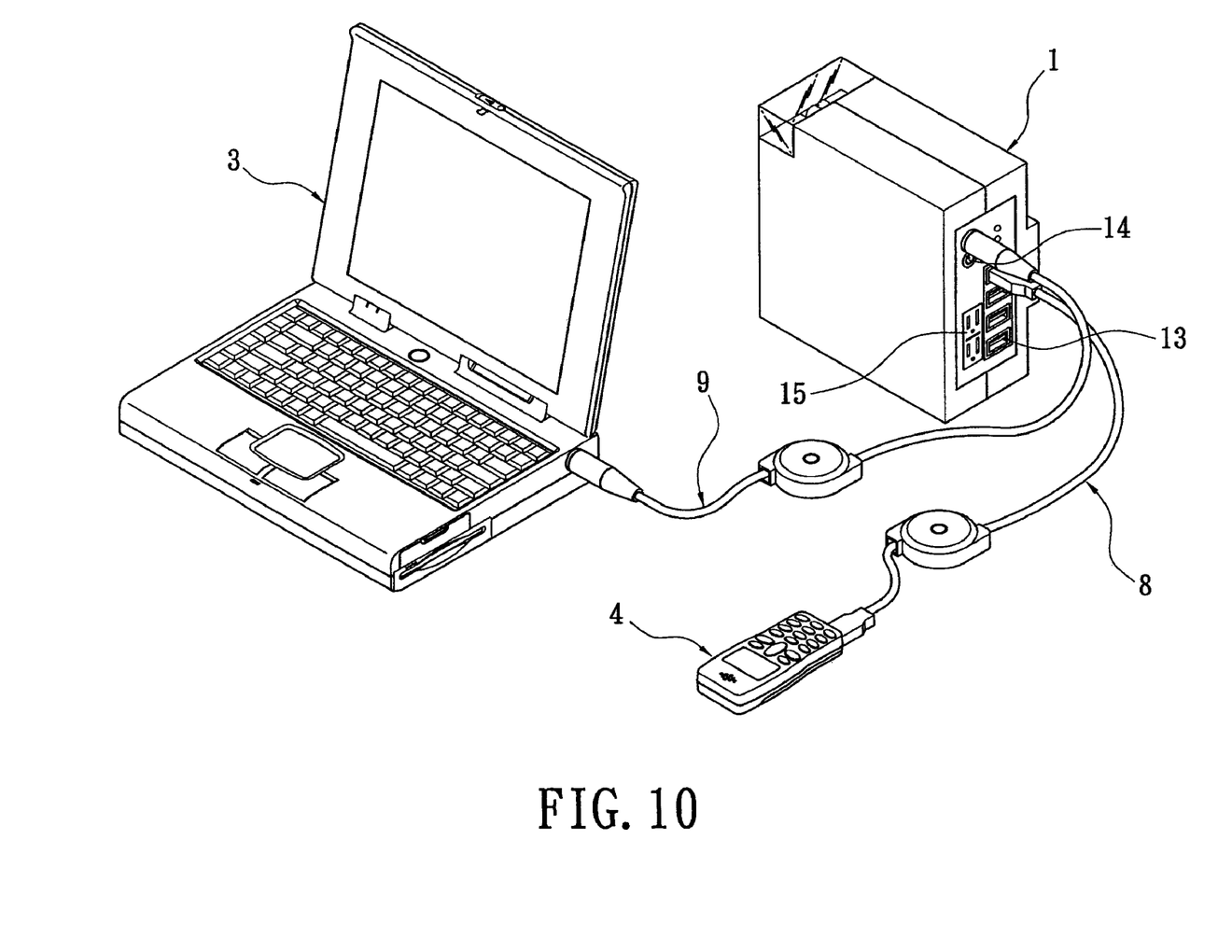
FIG. 10 is another perspective view of the operating status of the power supply of the present invention.
Figure 11:
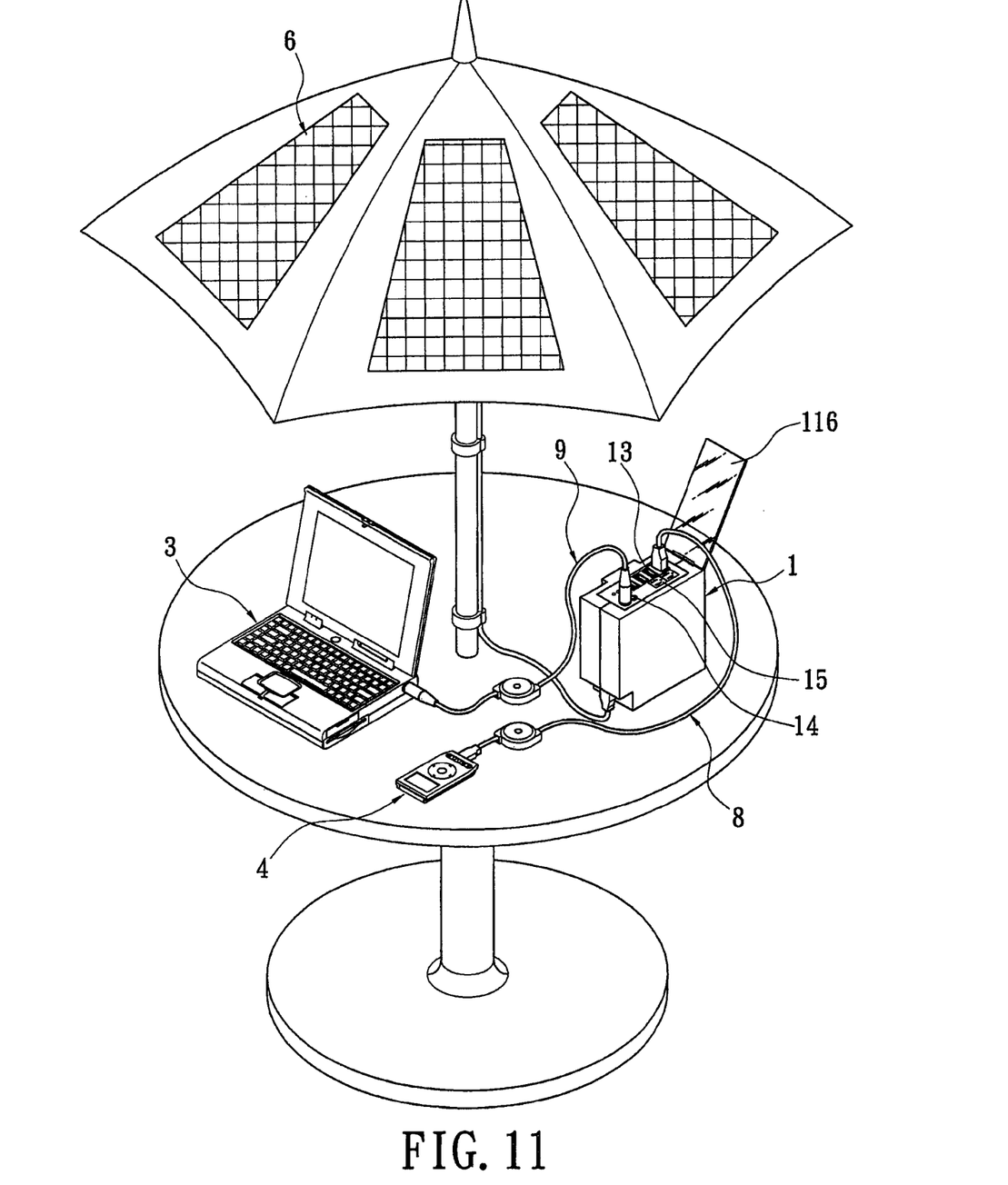
FIG. 11 is a perspective view of the power supply in an operating status and in a charging status of the present invention.

The present invention uses the rechargeable power supply 1 to convert and output DC power to the power output portions 13, 14 for portable devices with storage batteries. As shown in FIGS. 9, 10, and 11, the present invention provides a power supply system to the portable devices, 3, 4, and 5 (such as laptops, cell phones, and MP3 players, etc.). Whether indoors or outdoors, a handy and easy power supply system is thereby provided to the user. Therefore, the problem of portable devices not operating due to a lack of power is solved.

Figure 13:
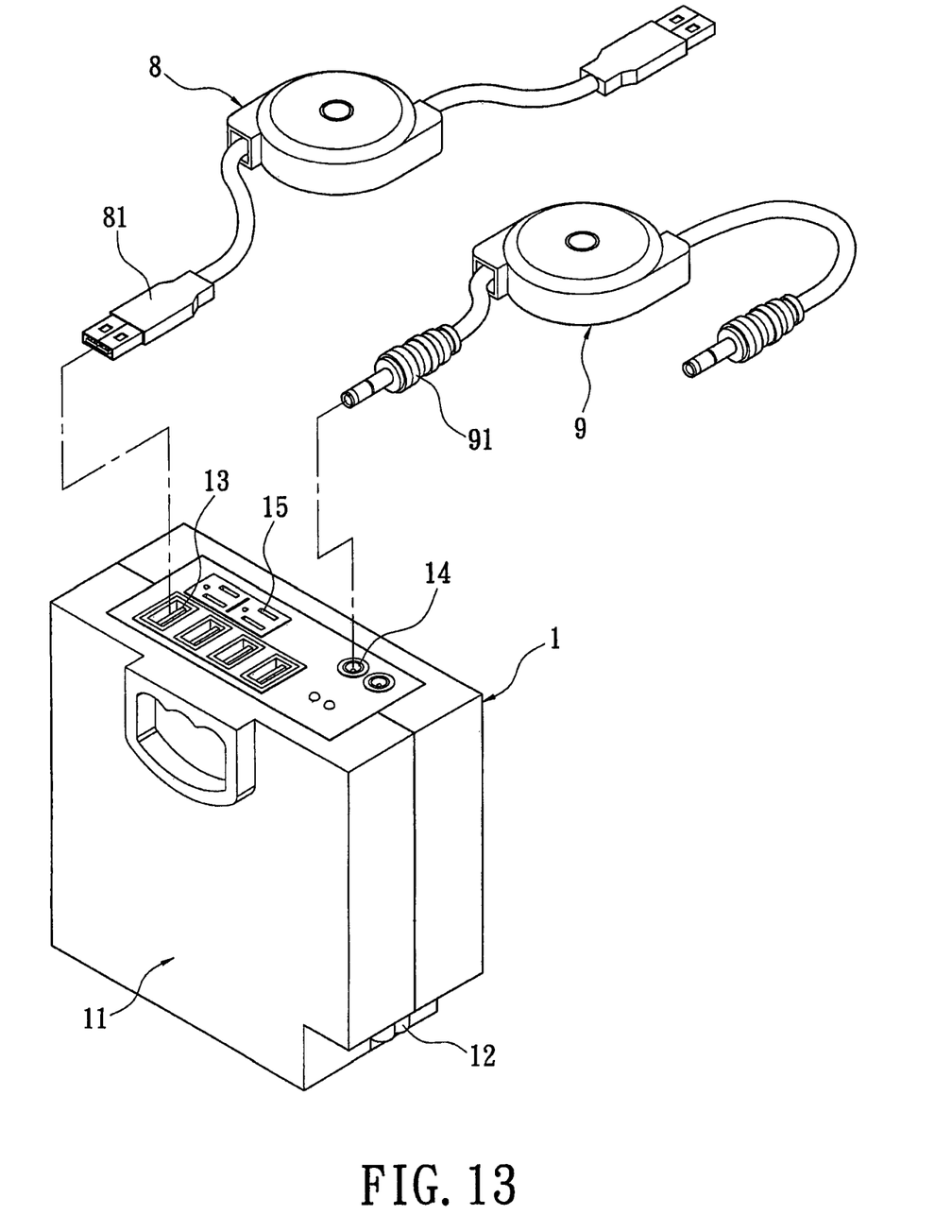
FIG. 13 is a perspective view of the power wire connector of the present invention.

The power supply of the present invention can be applied indoors, outdoors, and at any public location, but is especially useful for commercial locations, such as a coffee house, or a store, etc. The present invention can provide a great amount of portable power supply 1 for consumers. When a consumer needs power, the consumer rents the power supply 1 from the store owner, and uses the power wire connectors 8, 9 (as shown in FIG. 13) provided by the store owner which are suitable for a variety of devices. Therefore, the quantity of the required sockets is reduced, and the problem of the charging wires being disorganized and interfering with each other is solved.

In this embodiment, the power wire connector 8 is a USB socket 81 that is suitable for a cell phone, and an MP3 player. The power wire connector 9 is a DC socket 91 that is suitable for a laptop. Therefore, the power wire connector 8 can be electrically connected between the first power output portion 13 of the power supply 1 and the portable devices 4 and 5. The power wire connector 9 can be electrically connected between the second power output portion 14 of the power supply 1 and the portable device 3. Thereby, power in the storage battery 16 of the power supply is transmitted to the portable devices 3, 4 and 5 via the power wire connectors 8 and 9.

The power supply 1 of the present invention can be applied to a fixed table or a portable table (as shown in FIG. 9). By matching the tables with different types, the fastening methods and the disposed location can also be different (as shown in FIGS. 10 and 11). When the power supply is operating indoors or outdoors, the structures can be different. For example, a waterproof cover 116 can be added when the power supply is operating outdoors. As shown in FIG. 9, the power supply 1 is located at a fastening base 7 under the table by using a sliding track.

Figure 12:
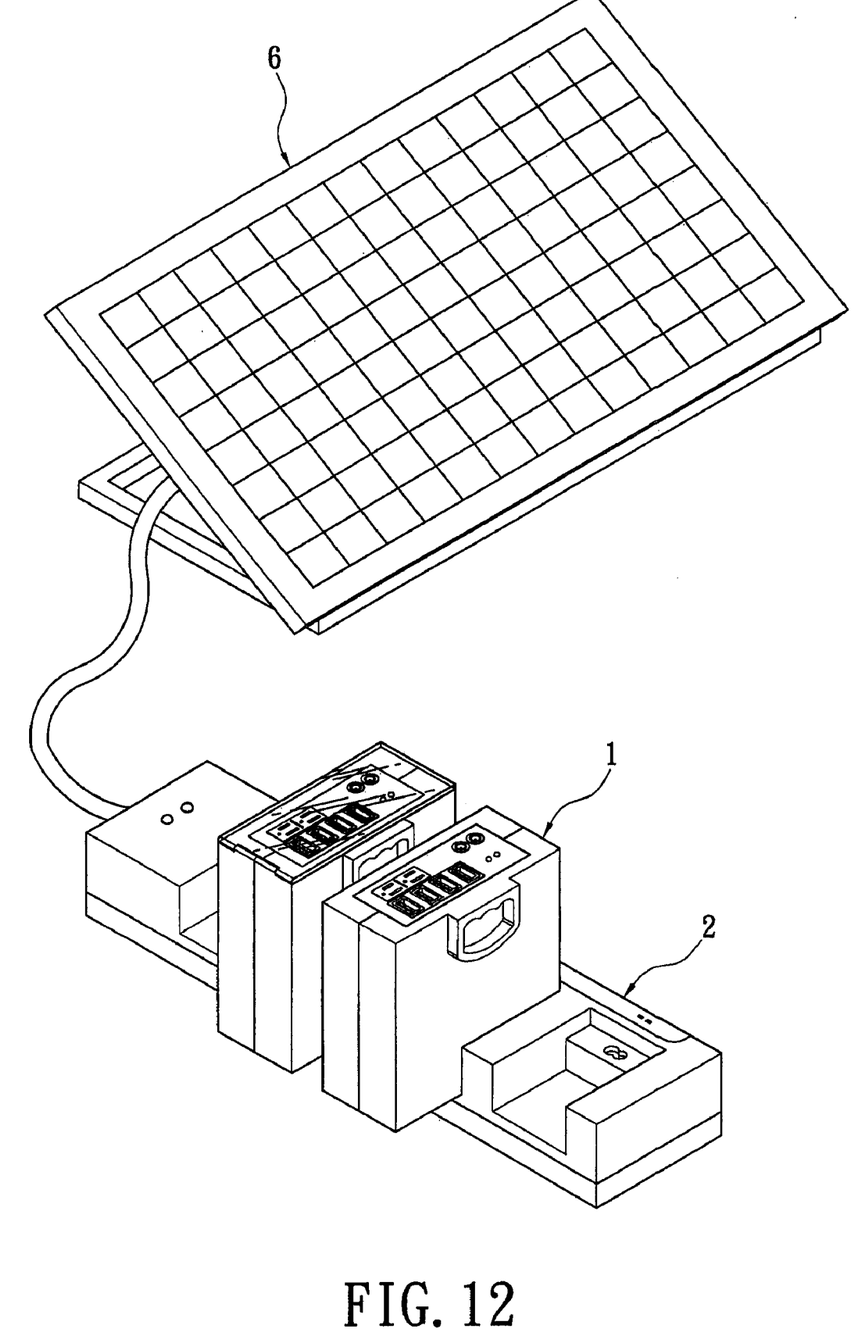
FIG. 12 is a perspective view of the power supply of the present invention in a charging status.

When the power supply is operating outdoors, it can also utilize solar energy or other power sources (such as a wind power generator, a water power generator, or a gasoline or diesel oil generator) to charge the power supply or the multi-hole charging station. As shown in FIG. 11, in this embodiment, the power supply 1 is electrically connected with a solar power board 6 and charges the power supply 1. As shown in FIG. 12, in this embodiment, the charging station 2 is electrically connected with the solar power board 6 and charges the multi-hole charging station 2.

Figure 7:
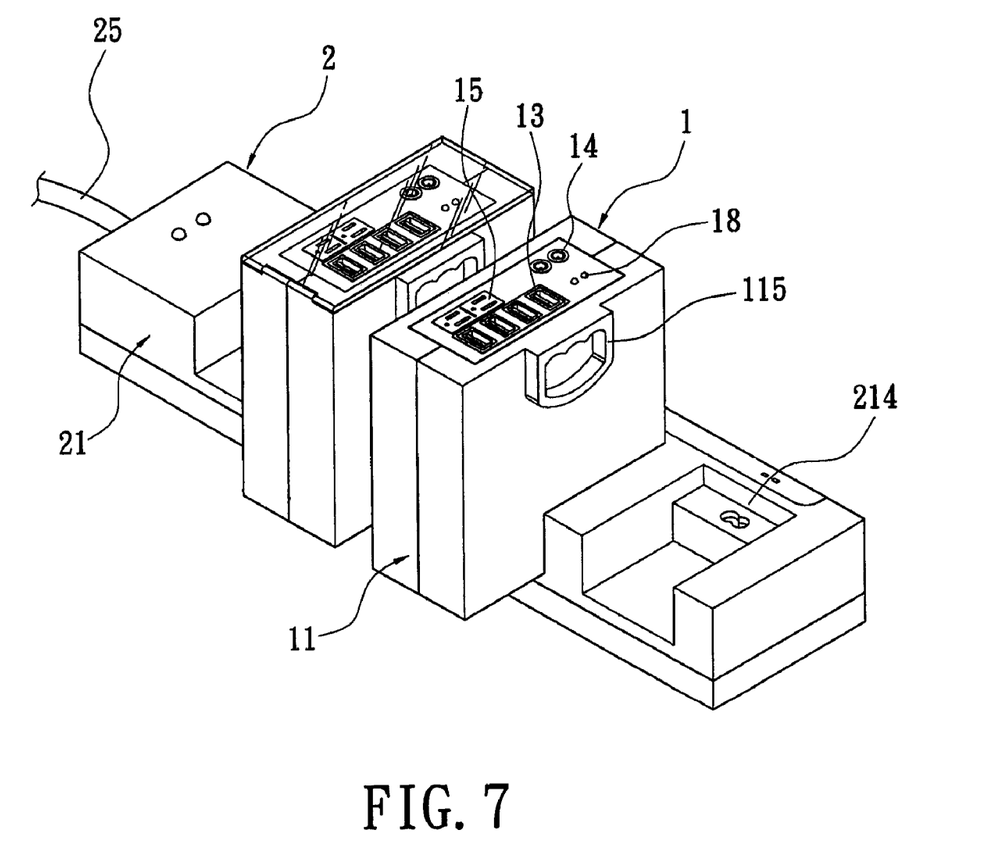
FIG. 7 is a perspective view of the power supply and the charging station located of the present invention on the ground.
Figure 8:
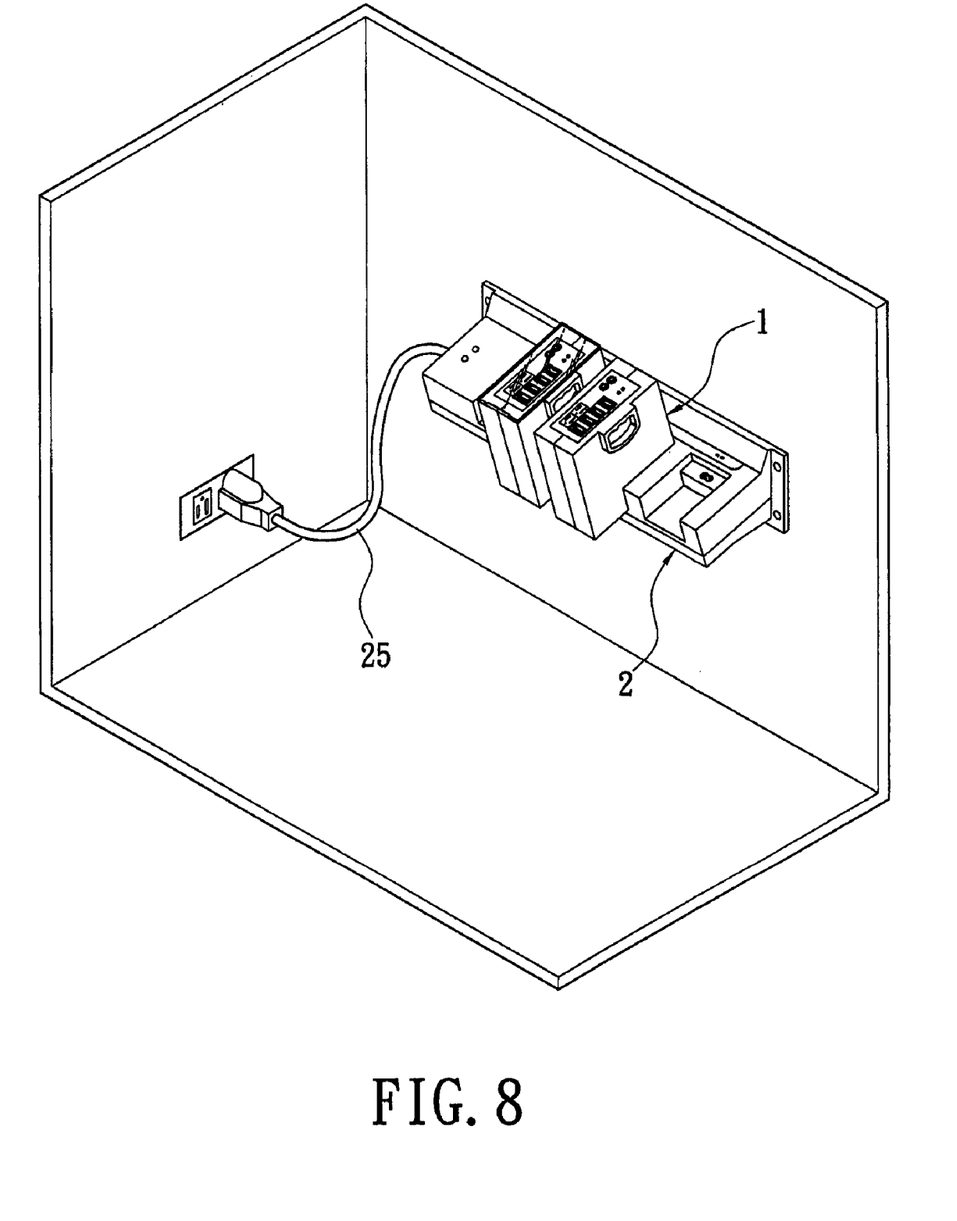
FIG. 8 is a perspective view of the power supply and the charging station of the present invention located on a wall.

When power of the power supply 1 is exhausted, the present invention utilizes the wireless transmission function (such as the RF or Z-wave method) provided from the first wireless module 172 to issue a power exhausted signal to the charging station 2 which is received by the second wireless module 231. Next, the second indicating lamp 26 issues an alarming light or the alarming device issues an alarming sound to inform the store owner. When the power supply 1 needs to be charged, the power supply 1 is gathered at the charging station 2, and is charged by the multi-hole charging station 2. The charging station 2 can be placed on the ground (as shown in FIG. 7) or be fastened on a wall (as shown in FIG. 8).

The present invention provides a handy and simple power supply. In order to match the operating environment or prevent the power supply being stolen by the user, the wireless transmission function (such as the RF or Z-wave method) provided from the first wireless module 172 and the second wireless module 231 is utilized. When the power supply 1 is moved away from the store to a predetermined distance, the alarming device in the power supply 1 and the charging station 2 issues an alarming sound to alert the store owner of this event.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. A power supply system for use with portable apparatuses, comprising:
    a plurality of power supplies, each of the power supplies including a housing, a power input portion, a plurality of power output portions, a storage battery, and a first circuit board, the first circuit board having a DC-to-AC converter and at least two DC-to-DC converters, the storage battery and the first circuit board being located in the housing, the first circuit board being electrically connected with the storage battery, and the power input portion and the power output portions being electrically connected with the first circuit board, whereby each of the power supplies provides multiple DC output voltages and an AC output voltage; and
    at least one charging station, the charging station including a base, a plurality of charging connectors, each charging connector being provided for electrical connection to a corresponding one of said power input portions of said plurality of said power supplies, and a second circuit board, the base having a plurality of charging ports that are respectively formed corresponding to said housings of the power supplies and can respectively receive and contain said housings of the power supplies, each of said charging ports providing for fixed connection to one of said power supplies, the second circuit board being located in an interior of the base, the charging connectors being electrically connected with the second circuit board, and the charging connectors respectively correspond to the charging ports for charging corresponding power supplies connected to and received in the charging ports.

2. The power supply system for use with portable apparatuses as claimed in claim 1, wherein the housing includes a first half shell, a second half shell, and a cover, the first half shell and the second half shell are assembled together, the cover is installed on one side of the first half shell and the second half shell, and the power output portions are exposed to an outside of the cover of the housing.

3. The power supply system for use with portable apparatuses as claimed in claim 1, wherein an outside of the housing has a handle.

4. The power supply system for use with portable apparatuses as claimed in claim 1, wherein the housing is pivoted with a waterproof cover, and the waterproof cover covers the power output portions.

5. The power supply system for use with portable apparatuses as claimed in claim 1, wherein the power input portion is covered by a protecting cover.

6. The power supply system for use with portable apparatuses as claimed in claim 1, wherein the power output portion is a USB connector.

7. The power supply system for use with portable apparatuses as claimed in claim 1, wherein the power output portion is a DC socket.

8. The power supply system for use with portable apparatuses as claimed in claim 1, wherein the power output portion is an AC socket.

9. The power supply system for use with portable apparatuses as claimed in claim 1, wherein the power input portions are connected respectively with a power wire connector.

10. The power supply system for use with portable apparatuses as claimed in claim 1, wherein the first circuit board includes a first wireless module, and the second circuit board includes a second wireless module, the first wireless module wirelessly communicating a low power condition of a corresponding power supply to the second wireless module for providing an indication at the charging station of the low power condition of the corresponding power supply.

11. The power supply system for use with portable apparatuses as claimed in claim 1, wherein the first circuit board is electrically connected with at least one first indicating lamp.

12. The power supply system for use with portable apparatuses as claimed in claim 1, wherein the base includes a lower shell and an upper shell, and the lower shell and the upper shell are assembled together.

13. The power supply system for use with portable apparatuses as claimed in claim 1, wherein the charging ports are located and indented on the base.

14. The power supply system for use with portable apparatuses as claimed in claim 1, wherein the charging connectors are electrically connected with a third circuit board, the third circuit board is located in the base, the third circuit board is electrically connected with the second circuit board, and the second circuit board and the third circuit board are electrically connected with a plurality of second indicating lamps.

15. The power supply system for use with portable apparatuses as claimed in claim 1, wherein the second circuit board is electrically connected with a power wire.

16. The power supply system for use with portable apparatuses as claimed in claim 1, wherein the charging station is connected with a solar power generator, a wing power generator, a water power generator, a gasoline generator, or a diesel oil generator.

* * * * *